United States Patent [19]

Karchewski

[11] Patent Number: 4,944,355

[45] Date of Patent: Jul. 31, 1990

[54] CASTER WHEEL CONTROL APPARATUS

[75] Inventor: John Karchewski, Regina, Canada

[73] Assignee: Brandt Industries, Ltd., Saskatchewan, Canada

[21] Appl. No.: 375,355

[22] Filed: Jul. 3, 1989

[30] Foreign Application Priority Data

Jul. 20, 1988 [CA] Canada ............................ 572602

[51] Int. Cl.⁵ .............................................. A01B 73/06
[52] U.S. Cl. ................................. 172/278; 172/311; 172/386; 239/167
[58] Field of Search ............... 172/383, 385, 386, 310, 172/311, 456, 315, 316, 278; 16/18 R, 34, 35 R; 239/163, 164, 166, 167, 168; 280/656

[56] References Cited

U.S. PATENT DOCUMENTS

| | | | |
|---|---|---|---|
| 3,324,956 | 6/1967 | Ritchie | 172/386 |
| 3,556,561 | 1/1971 | Gingue | 16/35 R X |
| 3,700,042 | 10/1972 | Patterson et al. | 172/385 |
| 3,701,385 | 10/1972 | Patterson et al. | 172/386 |
| 4,147,305 | 4/1979 | Hunt | 172/386 X |
| 4,359,105 | 11/1982 | Van Natta | 172/386 |
| 4,368,806 | 1/1983 | Raineri | 172/386 X |
| 4,682,462 | 7/1987 | Johnson, Sr. | 172/386 X |
| 4,709,857 | 12/1987 | Wilger | 239/164 |
| 4,739,930 | 4/1988 | Pask | 239/164 X |

FOREIGN PATENT DOCUMENTS 8809699 12/1988 PCT Int'l Appl. ................ 239/167

Primary Examiner—Randolph A. Reese
Assistant Examiner—Jeffrey L. Thompson
Attorney, Agent, or Firm—George A. Seaby

[57] ABSTRACT

In general, the remote control of a caster wheel assembly on a farm implement such as a crop sprayer of the type including a boom rotatable between a transport position and a field position is a complicated operation. In the transport position, the wheel assembly should be fixed, i.e. non-castering and in the field position the wheel assembly should caster freely. A relatively simple apparatus for effecting caster wheel assembly control includes a frame mounted on the boom, a hydraulic cylinder on the frame, and a linkage connected to the piston rod of the cylinder and releasably connected to an arm on the shaft carrying the wheel assembly, whereby initial extension of the piston rod moves the wheel assembly to a turning position, full piston rod extension causes release and thus free castering of the wheel assembly in the field position, and retraction of the piston rod causes re-engagement of the wheel assembly by the linkage to lock the wheel assembly in the transport position. In the turning position, the wheel is at an acute angle with respect to the longitudinal axis of the boom. With such an arrangement the boom can be moved into the field position by moving the implement a relatively short distance of 100 feet, instead of the 200-300 yards normally required.

6 Claims, 6 Drawing Sheets

CASTER WHEEL CONTROL APPARATUS

BACKGROUND OF THE INVENTION

1. Field of the Invention

This invention relates to an apparatus for controlling a caster wheel on a farm implement.

2. Discussions of the Prior Art

Farm implements such as crop sprayers include elongated booms pivotally connected to a trailer for rotation between a transport position in which the booms are aligned with the direction of vehicle travel and a use position in which the booms extend outwardly, perpendicular to the direction of vehicle travel. On currently available implements, the boom movement is controlled by the operator from the tractor seat. Examples of such implements are described in Canadian Pat. No. 1,230,866, which issued to G.S. Pask on Dec. 29, 1987 and in U.S. Pat. Nos. 3,324,956, which issued to W.D. Ritchie on June 13, 1967; 3,700,042, which issued to R.E. Patterson et al on Oct. 24, 1972 and 3,701,385, which issued to R.E. Patterson et al on Oct. 31, 1972.

In general, the patented devices are somewhat complicated or do not provide a satisfactory solution to the problem of controlling the boom supporting wheels from the driver's seat. The problems in this case include the controlled locking of the wheels in the transport position, simple unlocking of the wheels for free castering movement, and the orienting of the wheels to enable quick change between the transport and use or field positions.

The object of the present invention is to provide a solution to the above identified problems by providing a relatively simple apparatus for controlling a caster wheel or wheel assembly on a farm implement which facilitates locking and unlocking of the wheel, and the orienting of the wheel to enable quick conversion from one condition to another, i.e. free castering to locked and vice versa.

GENERAL DESCRIPTION OF THE INVENTION

Accordingly, the present invention relates to an apparatus for controlling a caster wheel assembly on a farm implement of the type including a boom for rotation between a transport position in which the boom is aligned with the direction of implement travel and a field position in which the boom is angled or perpendicular to the direction of implement travel, said apparatus comprising fluid actuated cylinder means for mounting on the boom; piston rod means extending out of said cylinder means; linkage means connected to said piston rod means for rotation thereby and releasably engageable with said wheel assembly, whereby initial extension of said piston rod means rotates said linkage means and consequently said wheel assembly to a turning position, further extension of said piston rod means causes the release of said wheel assembly permitting free castering thereof, and retraction of said piston rod means causes re-engagement of said wheel assembly by said linkage means to lock the wheel assembly in the transport position.

BRIEF DESCRIPTION OF DRAWINGS

The invention will be described in greater detail with reference to the accompanying drawings, which illustrate a preferred embodiment of the invention, and wherein.

DESCRIPTION OF PREFERRED EMBODIMENTS

Figure 1:
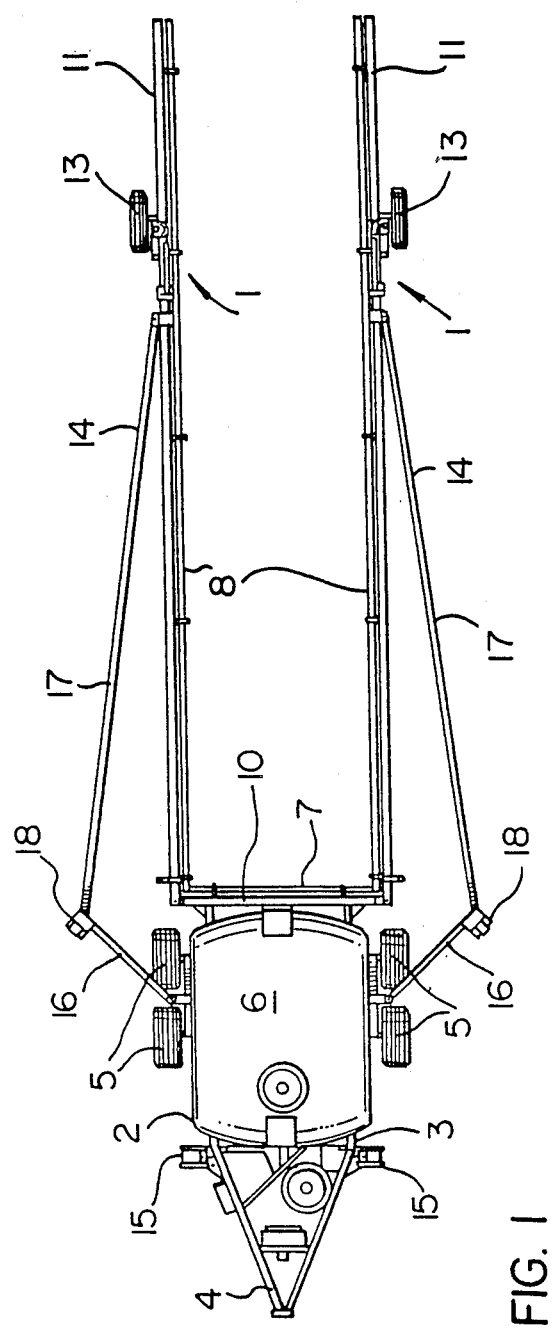
FIG. 1 is a plan view in elevation of a crop sprayer incorporating an apparatus in accordance with the present invention.
Figure 2:
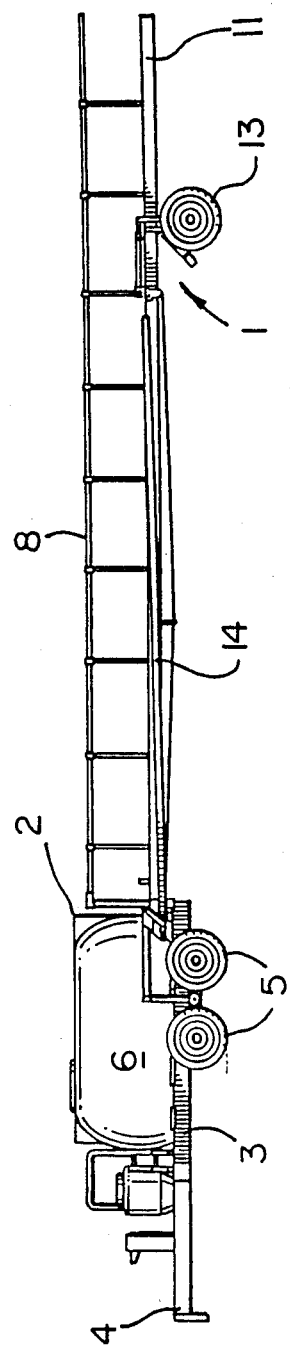
FIG. 2 is a side elevational view of the sprayer of FIG. 1.

With reference to FIGS. 1 and 2, the apparatus of the present invention which is generally indicated at 1 is shown in use on a crop sprayer 2 of the type including a trailer 3 for attachment to a towing vehicle (not shown). For such purpose, a tow bar 4 is provided on the front or leading end of the trailer 3, which is supported by wheels 5. The trailer carries a tank 6, containing liquid to be sprayed through a spray tube defined by a central fixed section 7, and arms or wings 8. The fixed section 7 of tube is carried by a fixed central boom section 10, and the wings 8 are carried by movable boom sections 11. The boom sections 11, which are supported by wheels 13, are pivotally connected to the central section 10 for rotation around vertical axes, permitting movement from the transport position (FIGS. 1 and 2) in which the boom sections 11 are perpendicular to the central boom section 10, and the use or field position (not shown) in which the sections 11 are aligned with the fixed section 10, extending transversely outwardly from the trailer 3. In the use position, the boom sections 11 are fully extended laterally. The sections 11 are releasably locked in the extended, use position by so-called boom draws 14 and latches 15. Each boom draw 14 includes a pair of pivotally interconnected arms 16 and 17. One arm 16 is pivotally connected to the trailer 3 and the other arm 17 is pivotally connected to one boom section 11. In the extended, field position of the boom section 11, a connector 18 at the junction between the arms 16 and 17 is retained by the latch 15.

Figure 3:
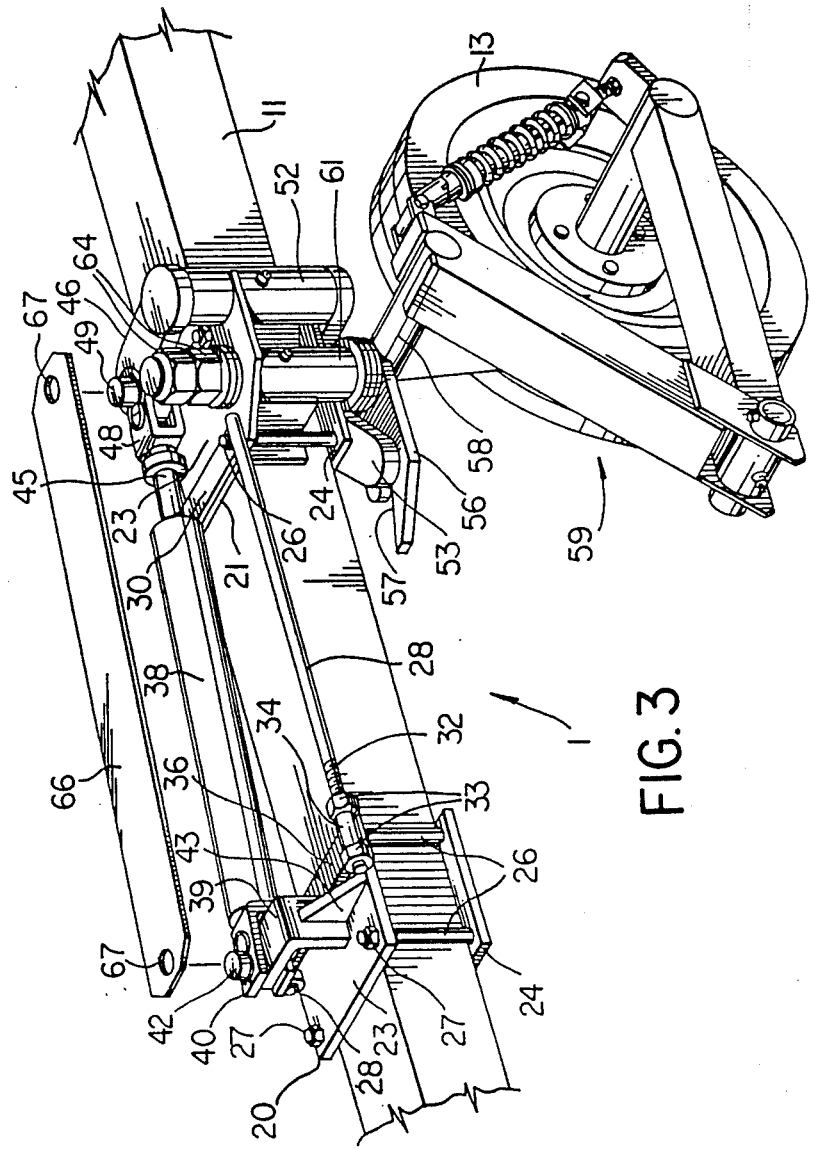
FIG. 3 is a partly exploded, perspective view from above of the front end of the apparatus of the present invention in the fixed or transport condition.

The foregoing is a description of existing hardware. The apparatus 1 of the present invention is associated with the wheels 13. As mentioned hereinbefore, in the roadway transport position, the wheels 13 should be locked in the non-castering position (FIGS. 1 to 3). In the use or field position, the wheels 13 should be freely castering to increase mobility and to prevent crop damage by the wheels.

The apparatus 1 includes a frame defined by a pair of brackets 20 and 21 mounted on the boom section 11. Each bracket 20 and 21 is defined by top and bottom plates 23 and 24, respectively interconnected by bolts 26 and nuts 27. A pair of rods 28 extend between the top plates 23 for maintaining the brackets 21 and 22 in spaced apart relationship. One end of each rod 28 is welded to a transversely extending, reinforcing strip 30 on the top plate 23 of the bracket 21, and the other end 32 of the rod 28 is threaded for receiving nuts 33. The threaded end 32 of the rod 28 extends through a sleeve 34 on a reinforcing strip 36 on the plate 23 of the bracket 20, and is retained therein by the nuts 33. Thus, when the nuts 27 clamping the brackets 20 or 21 on the boom section 11 are loosened, the nuts 33 can be rotated to change the spacing between the brackets 20 and 21.

One end of a hydraulic cylinder 38 is pivotally connected to an inverted L-shaped arm 39 on the top plate 23 of the bracket 20 by a clevis 40 and a pin 42. A triangular gusset 43 extends between the arm 39 and the plate 23 for reinforcing the connection therebetween. A piston rod 45 extends out of the other end of the cylinder 38, and is pivotally connected to one end of an arcuate lever 46 by a clevis 48 and a pin 49. The other end of the lever 46 is connected to the top end of a rod 50 (FIGS. 4 and 5), which is rotatably mounted in a sleeve 52 mounted in one edge of the top and bottom plates 23 and 24, respectively of the bracket 21. Extension or retraction of the piston rod 45 causes a corresponding rotation of the rod 50 in the sleeve 52. One end of a second lever defined by a bellcrank 53 is connected to the bottom end of the rod 50 for rotation therewith. A lug 55 (FIG. 5) extends downwardly from the free end of the bellcrank 53 for engaging one end of an arm 56, which includes a notch 57 in the outer free end thereof.

The arm 56 forms part of an assembly for supporting the boom wheel 13. Actually the arm 56 is connected to the inner end of a shaft 58, which is connected to the suspension generally indicated at 59 for the wheel 13. The suspension 59 does not form part of the apparatus of the present invention and accordingly, is not described in detail herein. The shaft 58 is generally L-shaped, and the inner vertical end thereof is rotatably mounted in a second sleeve 61 which is connected to the top and bottom plates 23 and 24 of the bracket 21. For such purpose, the top end of the shaft 58 is threaded for receiving nuts 64. The apparatus is completed by a locking bar defined by a strip 66 of metal with holes 67 near the end thereof for locking the apparatus in the transport condition.

In operation, with the bar 66 in position (FIG. 3) on the pins 42 and 49, the piston rod 45 cannot be extended and accordingly the bellcrank 53 and the lug 55 in the notch 57 lock the wheel assembly in the transport position. Thus, even if the hydraulic lines (not shown) to the cylinder 38 were to break, no problems will arise. For transport from one field to the next, the safety lock defined by the bar 66 is not required, and the apparatus can be operated from the tractor seat.

Figure 4:
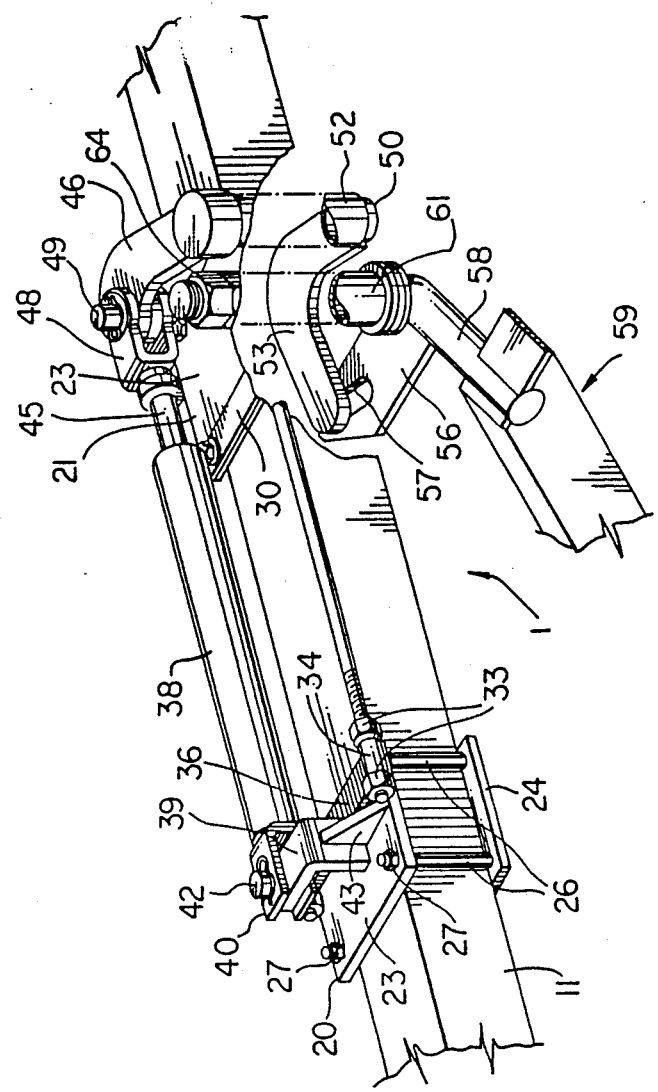
FIG. 4 is a partly sectioned, perspective view from above of the apparatus of FIG. 3 in the controlled turning condition.
Figure 5:
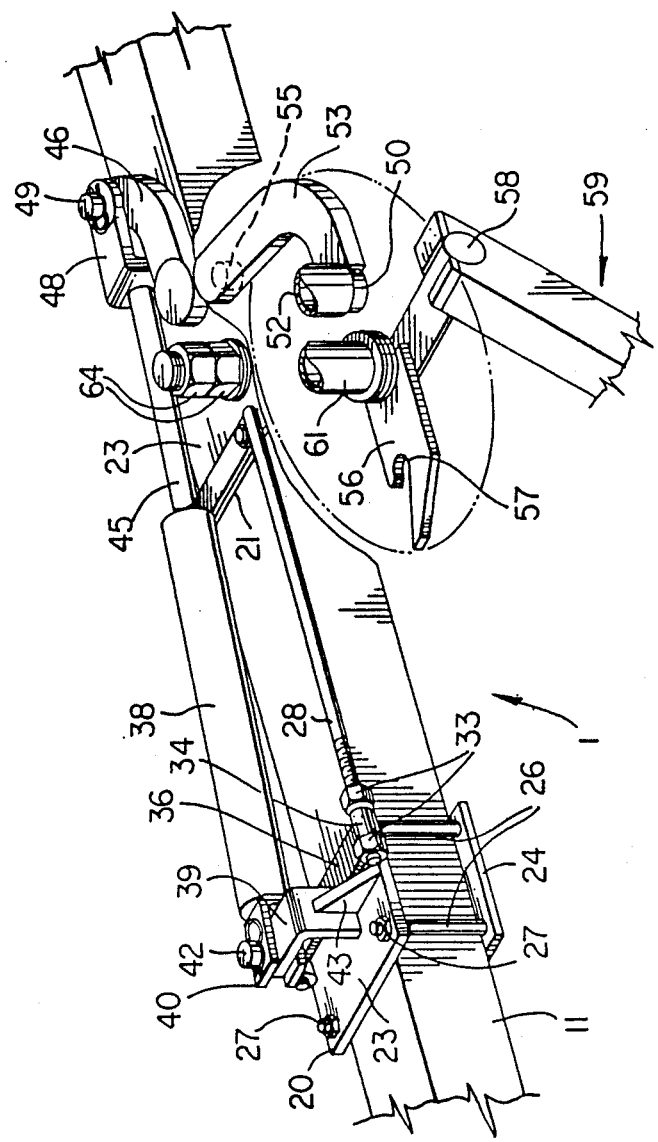
FIG. 5 is a partly sectioned, perspective view from above of the apparatus of FIGS. 3 and 4 in the freely castering condition.
Figure 6:
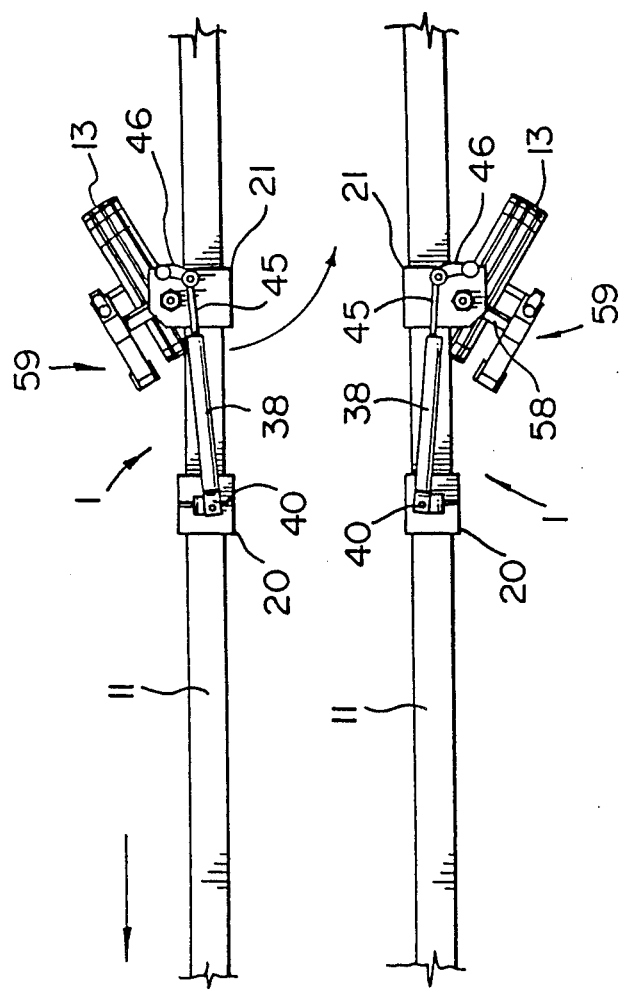
FIG. 6 is a plan view of sections of a pair of sprayer booms and the apparatus of FIGS. 3 to 5 in the controlled turning condition.

When the bar 66 is removed, and the cylinder 38 actuated to extend the piston rod 45, the lever 46 and consequently the rod 50 and the bellcrank 53 are rotated. Thus, the arm 56 is also caused to rotate approximately 45 degrees (or more) from the transport position (FIG. 3) to the partially turned position (FIGS. 4 and 6). Thus, the wheels 13 are angled with respect to the boom section 11, and held firmly in such position by the cylinder 38 and the interconnecting linkage. By moving the implement backwards, the boom sections 11 spread to the use or field position. When in the field position, control over the wheel 13 is neither required nor desirable. The wheel 13 must be free to caster in order to prevent damage to the field. When the piston rod 45 is fully extended (FIG. 5), lug 55 leaves the notch 57, and the wheel 13 can caster or rotate through 360 degrees.

Normally, during spraying, the boom sections 11 are releasably latched in the extended position By moving the vehicle in ,reverse, the wheels 13 become properly oriented, i.e. angled for locking in the transport position. Operation of the cylinder 38 causes retraction of the piston rod 45, and consequently reverse rotation of the lever 46, the rod 50 and the bellcrank 53 to move the lug into the notch 57. Continued retraction of the piston rod 45 moves the wheel 13 into transport position parallel to the boom section 11. With the boom sections 11 released, forward movement of the vehicle will cause the boom section 11 to assume the transport position.

For the sake of simplicity, the expression "boom section" has been replaced with the term "boom" in the appended claims.

We claim:

1. An apparatus for controlling a caster wheel assembly on a farm implement of the type including a boom for rotation between a transport position in which the boom is aligned with the direction of implement travel and a field position in which the boom is angled or perpendicular to the direction of implement travel, said apparatus comprising fluid actuated cylinder means for mounting on the boom; piston rod means extending out of said cylinder means; linkage means connected to said piston rod means for rotation thereby and releasably engageable with said wheel assembly, said linkage means including lever means connected to said piston rod means for rotation thereby; and arm means extending outwardly from said wheel assembly for releasable engagement by said lever means, wherein initial extension of said piston rod means rotates said lever means which engages and rotates said arm means and consequently said wheel assembly to a turning position, further extension of said piston rod means causes the release of said arm means and of said wheel assembly permitting free castering thereof in the field position, and retraction of said piston rod means causes reengagement of said arm means by said lever means to lock the wheel assembly in the transport position.

2. An apparatus according to claim 1, including frame means for mounting on the implement boom to support said cylinder means and said lever means.

3. An apparatus according to claim 2, wherein said lever means includes a first lever connected at one end to said piston rod above the implement boom; rod means extending downwardly from the other end of said first lever; and a second lever connected to said rod means beneath the implement boom for rotation therewith between arm means engaging and disengaging positions which corresponds to the transport and field positions, respectively.

4. An apparatus according to claim 3, wherein said second lever is a bellcrank.

5. An apparatus according to claim 4, including a notch in said arm means; and lug means on said bellcrank for insertion into and removal from the notch during movement of said bellcrank between said engaging and disengaging positions.

6. An apparatus for controlling a caster wheel assembly on a farm implement of the type including a boom for rotation between a transport position in which the boom is aligned with the direction of implement travel and a field position in which the boom is perpendicular to the direction of implement travel, said apparatus comprising fluid actuated cylinder means for mounting on the boom; piston rod means extending out of said cylinder means; lever means connected to said piston rod means for rotation thereby; shaft means carrying the wheel assembly; arm means extending outwardly from said shaft means for engagement by said lever means, wherein initial extension of said piston rod means rotates said lever means, which engages and rotates said arm means and said shaft means, and consequently said wheel assembly from the transport position to a turning position, further extension of said piston rod means causes the release of said arm means by said lever means, permitting free castering of said wheel assembly in the field position, and retraction of said piston rod means causes re-engagement of said arm means by said lever means to lock the arm means and consequently said wheel assembly in the transport position.

* * * * *